Sept. 28, 1971  S. A. PFISTER  3,608,185
MACHINE TOOL

Filed April 10, 1969  8 Sheets-Sheet 1

INVENTOR
STANLEY A. PFISTER

BY Norman S. Blodgett
ATTORNEY

Sept. 28, 1971  S. A. PFISTER  3,608,185
MACHINE TOOL

Filed April 10, 1969  8 Sheets-Sheet 5

STEP D

STEP E

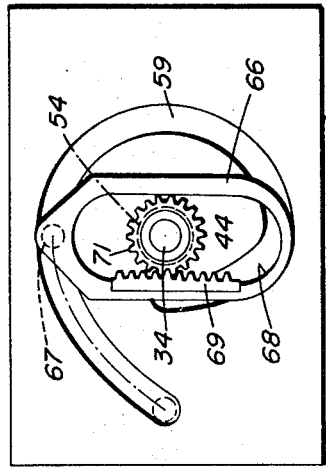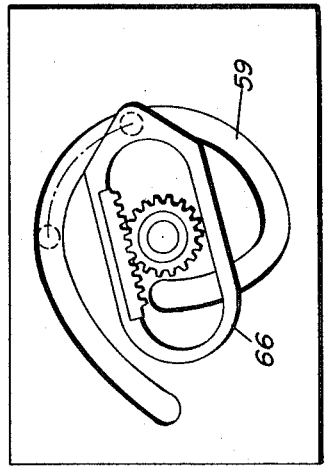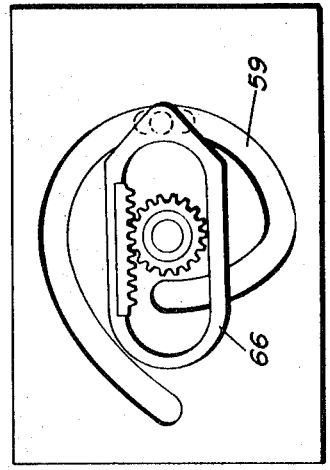
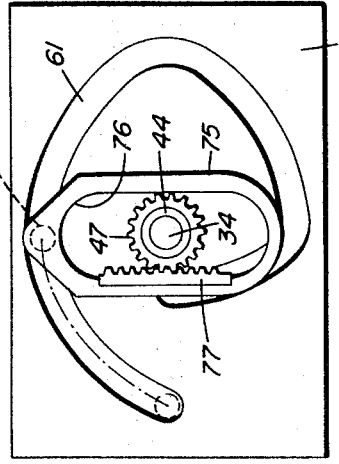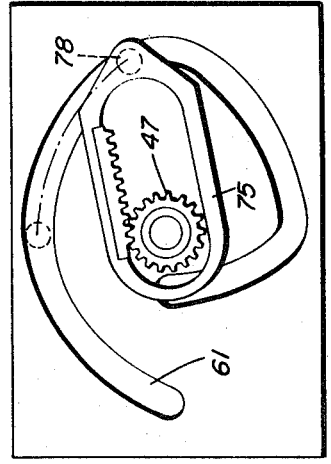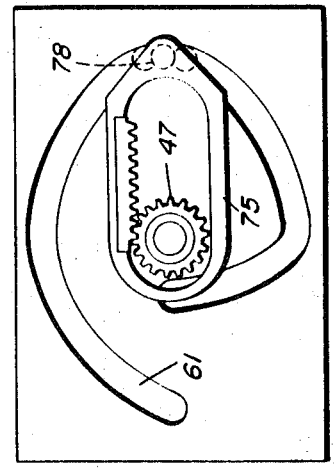
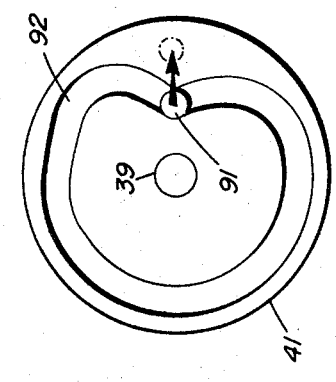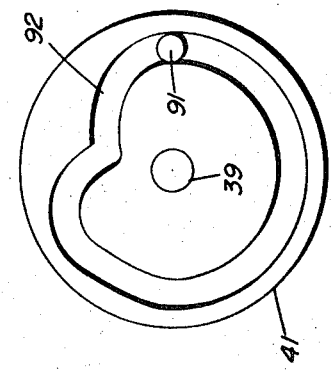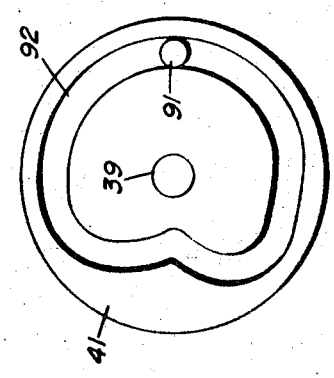
FIG. 6A Sept. 28, 1971  S. A. PFISTER  3,608,185
MACHINE TOOL
Filed April 10, 1969  8 Sheets-Sheet 7
HOUSING
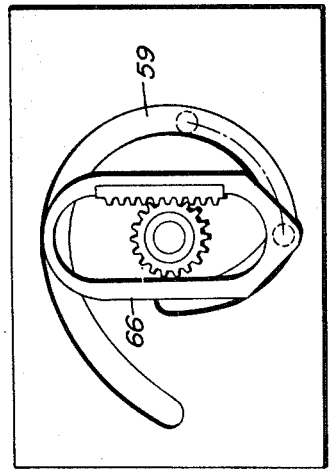 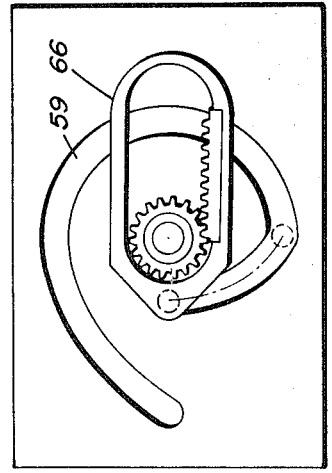
ARM
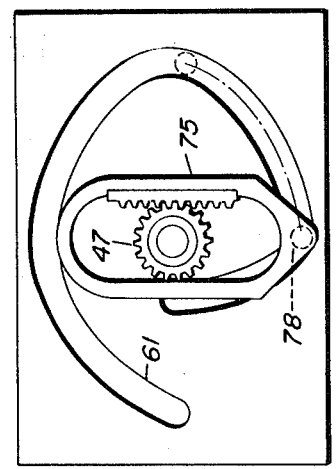 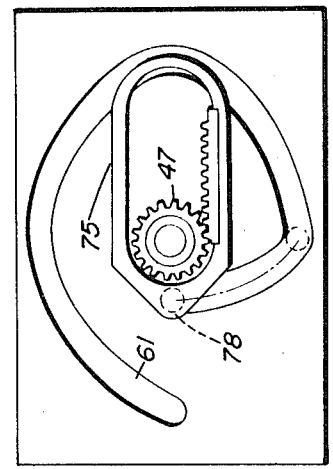
FINGER
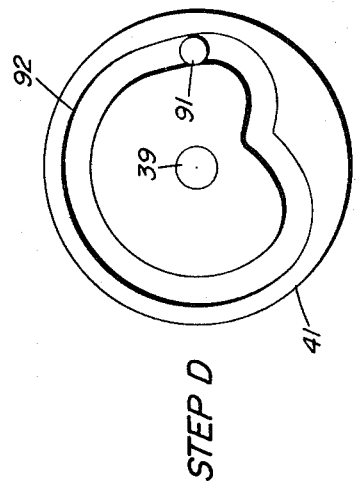 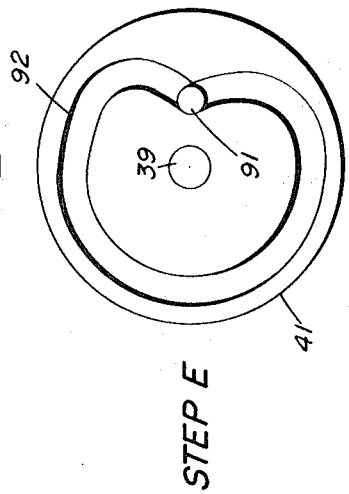
STEP D   STEP E
FIG. 6B

STEP A

STEP B

STEP C

United States Patent Office 3,608,185
Patented Sept. 28, 1971

3,608,185
MACHINE TOOL
Stanley A. Pfister, Wilmington, Ohio, assignor to Cincinnati Milacron Inc., Cincinnati, Ohio
Filed Apr. 10, 1969, Ser. No. 815,049
Int. Cl. B23q 3/157
U.S. Cl. 29—568　　　　　　　　　　　　　　8 Claims

ABSTRACT OF THE DISCLOSURE

This invention relates to a machine tool and, more particularly, to a numerically-controlled machining apparatus having tool-changing capability.

BACKGROUND OF THE INVENTION

In the design of numerically-controlled machine tools, wherein tool changing is part of the machine operation, it is common practice to provide means for transferring tools from a storage rack to the machine spindle. In many situations, however, the most desirable configuration of rack and spindle is not possible because tool-changing apparatus has not been available to accomplish this function. More particularly, this is true where the tool rack is mounted very closely adjacent the tool spindle and the tool must be moved rapidly from a position at a right angle to the machine spindle to the machine spindle area. A device for accomplishing this function is shown in the patent application of Seidel, Ser. No. 691,034, filed Dec. 15, 1967, now Pat. No. 3,492,717. However, in this device, a rather complex hydraulic fluid distribution system is necessary to accomplish the many functions found in such an interchanger device. This not only makes the interchanger quite expensive, but requires specialized hydraulic labor for repair and maintenance. Mechanical devices for accomplishing these many functions, however, can be hopelessly complicated and expensive. These and other difficulties experienced with the prior art devices have been obviated in a novel manner by the present invention.

It is, therefore, an outstanding object of the invention to provide a machine tool having an interchanger which is operated with purely mechanical elements.

Another object of this invention is the provision of an interchanger for a machine tool which is simple in construction and very rugged.

A further object of the present invention is the provision of a machine tool having an interchanger which, during its operation, swings through a very small space.

It is another object of the instant invention to provide a machine tool having an interchanger which performs its functions with mechanical means only and which, nevertheless, occupies very little space.

With these and other objects in view, as will be apparent to those skilled in the art, the invention resides in the combination of parts set forth in the specification and covered by the claims appended hereto.

SUMMARY OF THE INVENTION

In general, the present invention has to do with a machine tool having a toolhead in which a spindle is rotatably mounted and having a tool storage rack containing means for storing a plurality of tools and delivering them one-at-a-time to an interchange position where the axis of each tool so delivered extends generally at a right angle to the spindle axis. An interchanger is mounted between the said position and the spindle for moving a tool between the position and the spindle. The interchanger includes a main housing rotatable about an axis lying at a substantial angl to the spindle axis and the axis of a tool when in the said position. It also includes two arms mounted on opposite sides of the main housing, each connected for motion about a hinge axis passing at a right angle to a plane passing through the spindle axis and extending laterally from the hinge axis in opposite directions, and including at the end of each arm a clamping head.

More specifically, the spindle axis, the main shaft axis, and the axis of a tool in the said position lie in the same plane, each arm has an elongated portion which lies in a plane which is parallel to and spaced from the said plane, and an offset portion which carries the clamping head in a position adjacent the said plane. The three functions of clamping at the clamping heads, of swinging hingedly about the transverse axes, and of rotating about the main housing axis are all performed by drive shafts which are nested one within the other. The clamping action is performed by a solid shaft, while the other two functions are performed by tubular shafts which are concentric with the first shaft and with each other. A cam operated rack-and-pinion mechanism serves to perform the two functions of hinge swinging of the arms and rotation about the housing axis.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
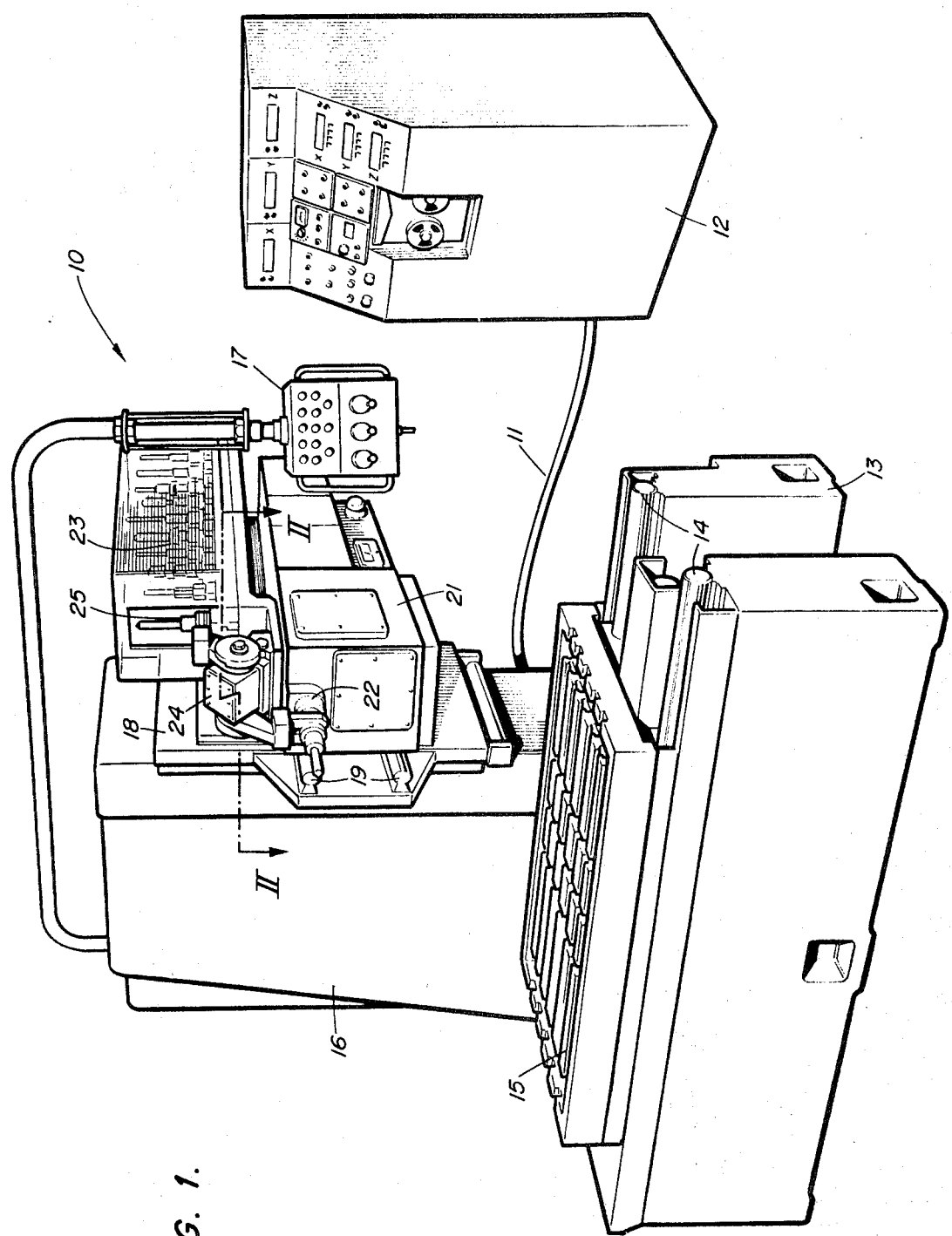
FIG. 1 is a perspective view of a machine tool embodying the principles of the present invention.

Referring first to FIG. 1, wherein are best shown the general features of the invention, the machine tool, indicated generally by the reference numeral 10, is shown as connected by cable 11 to a console 12. The machine tool and its console make up a numerically-controlled machine tool and it is provided with tool-changing capability, as will be described hereinafter. The machine tool is provided with a base 13 having parallel horizontal ways 14 having mounted thereon for movement along the X-axis a table 15 to which a workpiece is to be attached to be machined. Extending upwardly from the base 13 is a column 16 having a pendant control panel 17 attached thereto. The column 16 is provided with vertical ways (not shown) on which is mounted a saddle 18 for sliding in the Y-axis. This saddle is, in turn, provided with horizontal ways 19 on which is mounted for sliding along the Z-axis a toolhead 21 in which is rotatably carried a horizontal spindle 22. Mounted on the top of the toolhead 21 is a tool storage rack 23 similar to that shown and described in the patent application of Pfister Ser. No. 751,235, filed Sept. 20, 1968. Also mounted on the toolhead 21 and lying between the tool rack 23 and the spindle 22 is an interchanger 24. The rack 23 contains mechanism for delivering the next tool to be used to an interchange position 25 where the interchanger 24 carries it to the spindle 22 and, at the same time, delivers the old tool from the spindle 22 to the interchange position 25 for re-storage in the rack.

Figure 2:
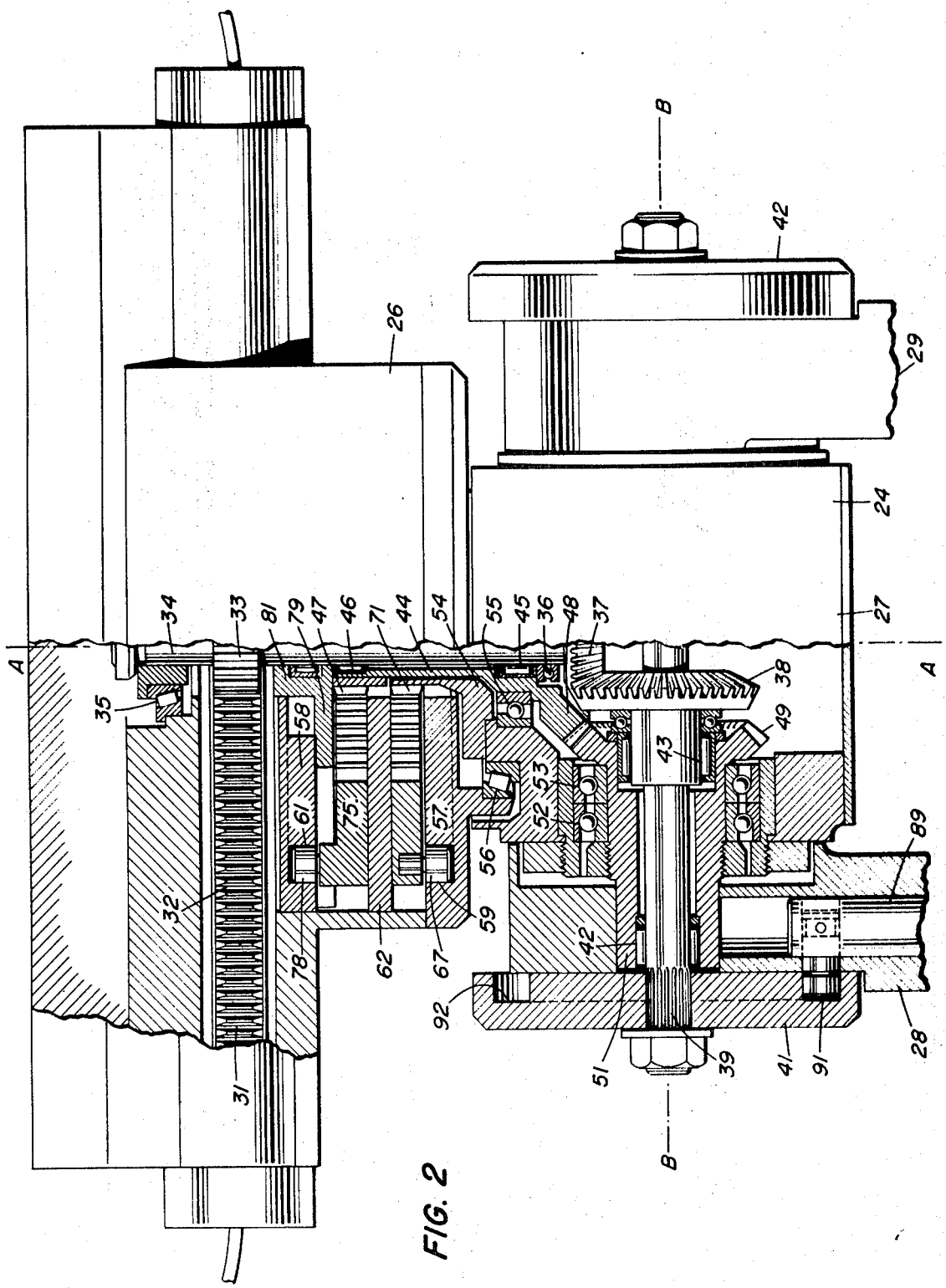
FIG. 2 is a side view of an interchanger forming part of the invention which is partly sectioned, the view being taken along the line II—II of FIG. 1.

Referring now to FIG. 2, it can be seen that the interchanger consists of a base 26 which is fastened to the top of the tool rack. A housing 27 adapted to rotate about an axis A—A (as is best evident in FIG. 1) lies at an angle to the axis of the spindle 22 and at an angle to the axis of a tool sitting in the interchange position 25. As a practical matter, the axis A—A bisects the angle between the two and lies at an angle of 45° to each. Hingedly attached to the opposite sides of the housing 27 are arms 28 and 29, each of which has at its ends a clamping head which is best shown in connection with FIGS. 4 and 5.

Mounted in the base 26 is an elongated piston 31, to the ends of which hydraulic pressure fluid can be supplied to cause reciprocation. The piston is formed with a rack 32 which engages a pinion gear 33 keyed to a shaft 34 which lies coaxially of the axis A—A and is carried in bearings 35 and 36. The outer end of the shaft 34 is provided with a bevel gear 37 engaging a bevel gear 38 which is mounted on a shaft 39 which, in turn, extends at a right angle to the axis A—A and carries on its outer end a cam plate 41. The bevel gear 37 of the shaft 34 engages another opposite bevel gear and shaft leading to a cam plate 42 associated with the arm 29. The shaft 39 is mounted on spaced roller bearings 42 and 43.

Rotatably mounted on the shaft 34 and rotatable thereabout is a tubular shaft 44. The interior of this shaft is carried on roller bearings 45 and 46, while axial thrust between the shaft 44 and the shaft 34 is absorbed by the ball bearing 36, which has been described above. At its end which lies adjacent the gear 33, the shaft 44 is provided with a straight pinion gear 47, while at the other end adjacent the gear 37 of the shaft 34, it is provided with a hollow bevel gear 48. This bevel gear 48 meshes with and drives a bevel gear 49 formed on one end of a hollow shaft 51 which is rotatably mounted on the shaft 37 by means of the roller bearings 42 and 43 described above. It is keyed to one end of the arm 28 and serves to swing that arm about the axis defined by the axis of the shaft 39 and the tubular shaft 51. The outer surface of the shaft 51 is mounted in ball bearings 52 and 53 which, in turn, are mounted in the housing 27. The gear 48 meshes with a similar gear and shaft for bringing about hinged motion of the arm 29 about the same transverse axis at a right angle to the main axis A—A.

The main housing 27 is provided with a tubular extension 54 which extends into the base 26 of the interchanger coaxially of the shaft 34 and the tubular shaft 44. As a matter of fact, the inner surface of the extension 54 lies along the outer surface of the shaft 44 and is rotatable relative to it. The ball bearing 55 absorbs radial forces between the housing 27 and the shaft 44, while a roller bearing 56 lies between the base 26 and the housing 27 to permit rotation of the housing relative to the base. It can be seen, then, that this construction allows independent rotation of the housing 27 relative to the base 26; it allows independent swinging of the arms 28 and 29 relative to the housing 27; and it allows the operation of the cam plates 41 and 42 independently of both the housing 27 and the arms 28 and 29.

Figure 3:
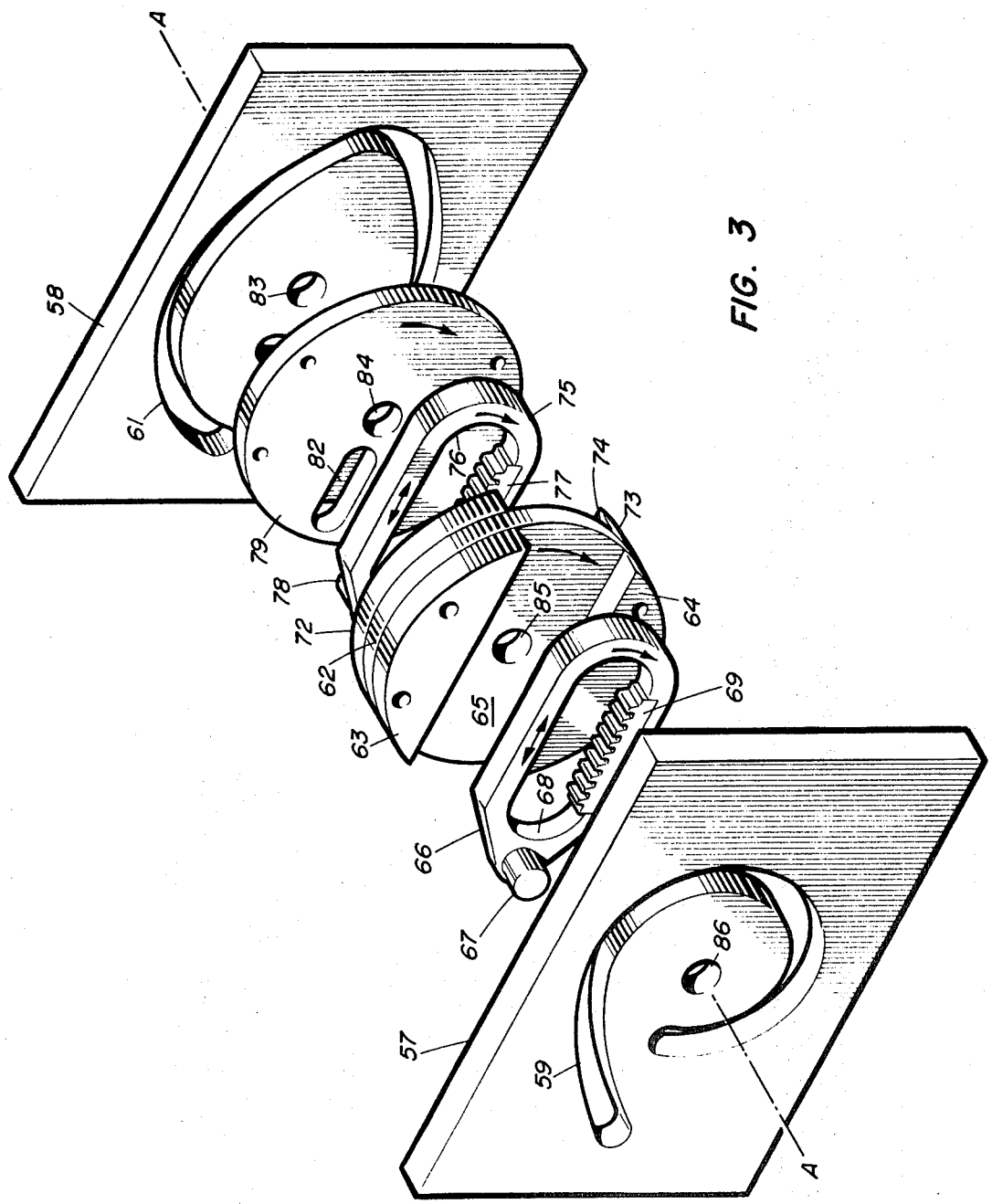
FIG. 3 is an exploded perspective view of a transmission train forming part of the interchanger.

In order to make it easier to understand the manner in which rack 32 drives the shaft 34 and also serves to drive the tubular shaft 44 of the arms and the tubular extension 54 of the housing, FIG. 3 has been drawn showing the parts in exploded relationship. At the ends of the assemblage are cam plates 57 and 58 having, respectively, cam grooves 59 and 61 and central apertures 83 and 86. These plates remain fixed at all times in the base 26. Midway between the two plates is a disc 62. On the side of the disc 62 which faces toward the plate 57 are mounted two blocks 63 and 64 having straight parallel edges which define a groove 65 in which lies a slide 66. The slide is elongated with circular ends and the elongated sides lie parallel to one another and fit slidably between the blocks 63 and 64 so that the slide 66 can only slide in this groove but cannot rotate relative to the disc 62. At one end the slide 66 is provided with a cam follower 67 which resides in the cam groove 59 of the plate 57. The slide is provided with an elongated aperture 68 along one edge of which is inserted a rack 69. This rack engages a straight pinion gear 71 formed at the inner end of the tubular extension 54 of the housing 27.

On the side of the disc 62 facing toward the plate 58 it is provided with blocks 72 and 73 which have spaced parallel sides facing one another to define a groove 74 in which lies a slide 75. The slide 75 is similar to the slide 66 and has an elongated aperture 76 formed in it and has mounted in the edge of the aperture a rack 77 which engages at all times the pinion gear 47 forming part of the tubular shaft 44 which operates the arms 28 and 29. The slide 75 is provided with a cam follower 78 (see FIG. 2) which at all times engages the cam groove 61 formed in the plate 58. Now, sandwiched between the plate 58 on the one hand and the blocks 72 and 73 and the follower 78 on the other hand is a disc 79. This disc is bolted to the blocks 72 and 73 so that it rotates at all times with the disc 62. The disc 79 is provided with a hub 81 (see FIG. 2) which fits snugly around the shaft 34 and is keyed to it, so that, when the shaft 34 is rotated, it also rotates the disc 79 and the disc 62 along with their appurtenances. The plate 79 is provided with an elongated slot 82 through which extends the cam follower 78 of the slide 75 so that it can lie within the cam groove 61.

The shaft 34 and the hub 81 of the plate 79 are keyed together independently of the plate 58. The plate 79 carries a bore 84 in its hub, which is keyed to shaft 34 and, as has been stated before, fits snugly around the outer surface of the shaft 34. The aperture 76 in the slide 75 allows the passage of the shaft 34 and the tubular shaft 44 as well as carrying, of course, the gear 47. A bore 85 in the disc 62 permits the passage of the tubular shaft 44 and the shaft 34 that lie within it. The aperture 68 in the slide 66 allows the passage of all three shafts, namely the shaft 34, the tubular shaft 44, and the tubular extension 54 of the housing 27. In addition, of course, it carries the gear 71 which drives the housing 27. Finally, the plate 57 has a bore 86 which passes all three shafts also.

Figure 4:
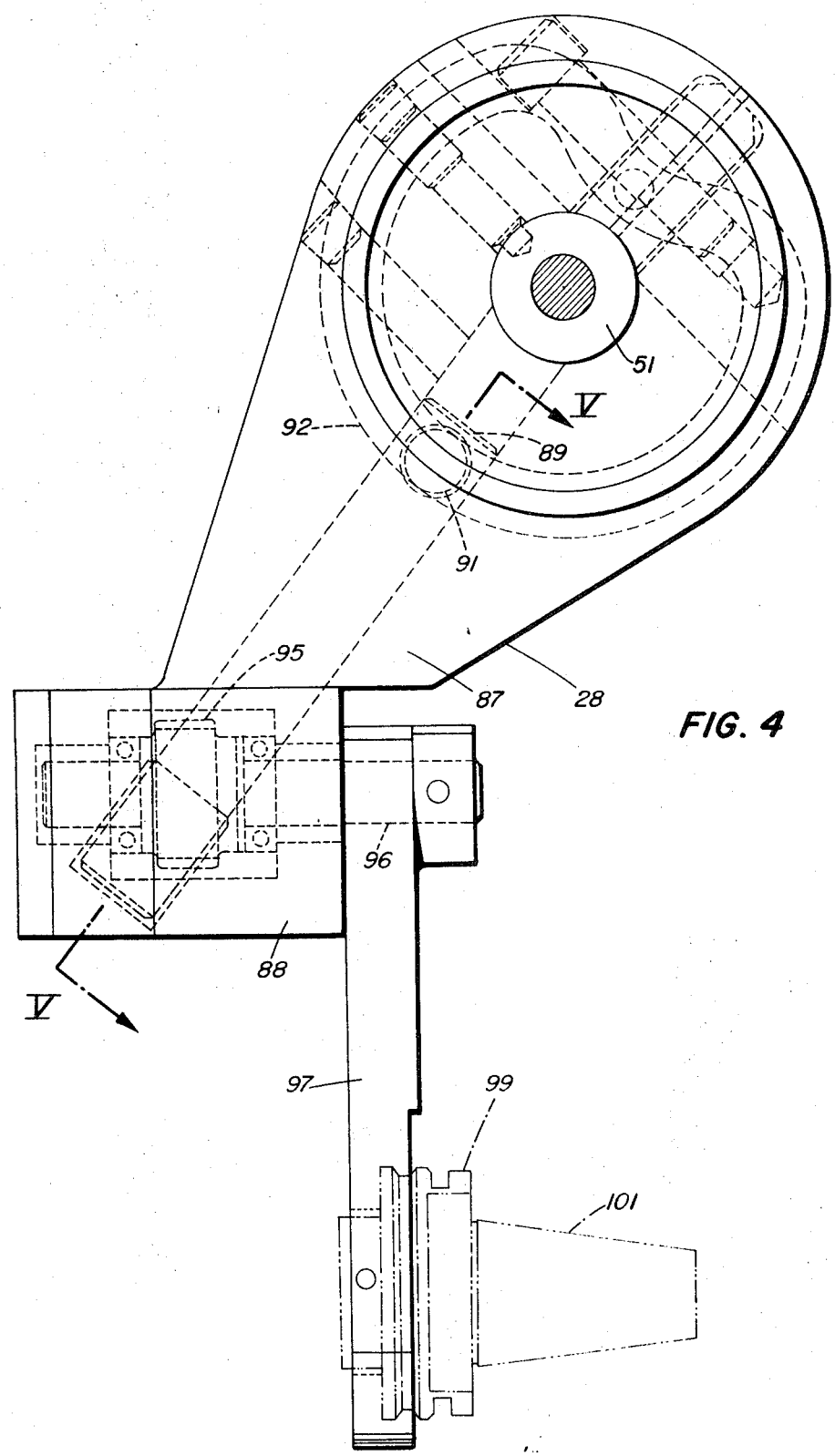
FIG. 4 is an end view of an arm forming part of the interchanger.
Figure 5:
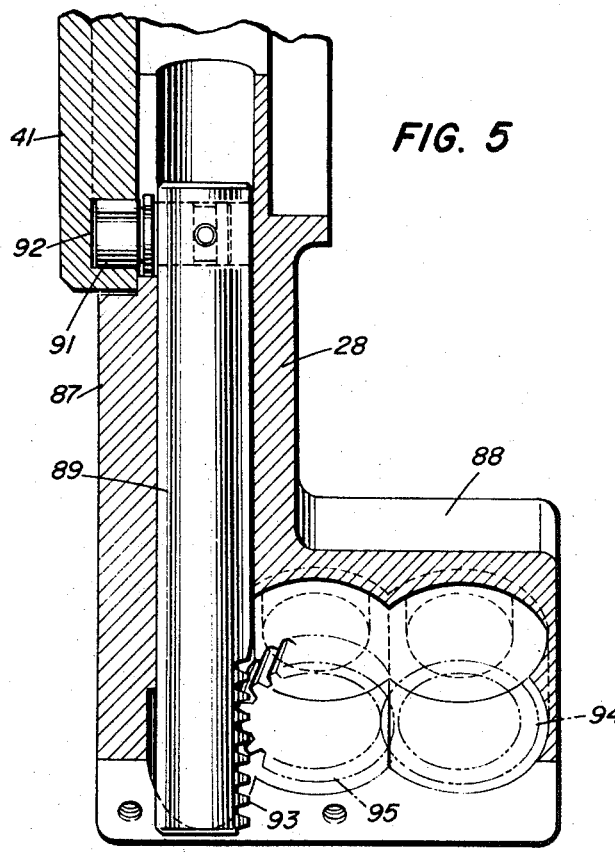
FIG. 5 is a sectional view of the arm taken on the line V—V of FIG. 4, FIGS. 6A and 6B are charts showing the various steps in the operation of the functional portions of the interchanger.
Figure 10:
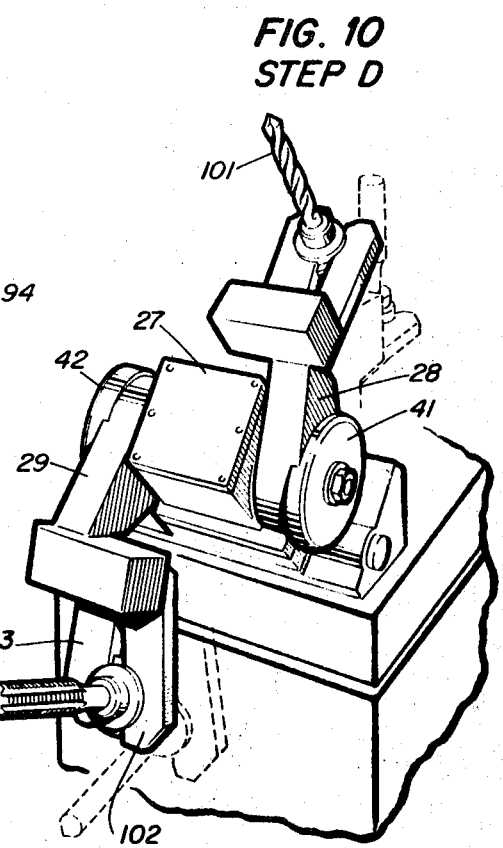
FIGS. 7 through 11 show in perspective the condition of the interchanger at various parts of the cycle.
Figure 11:
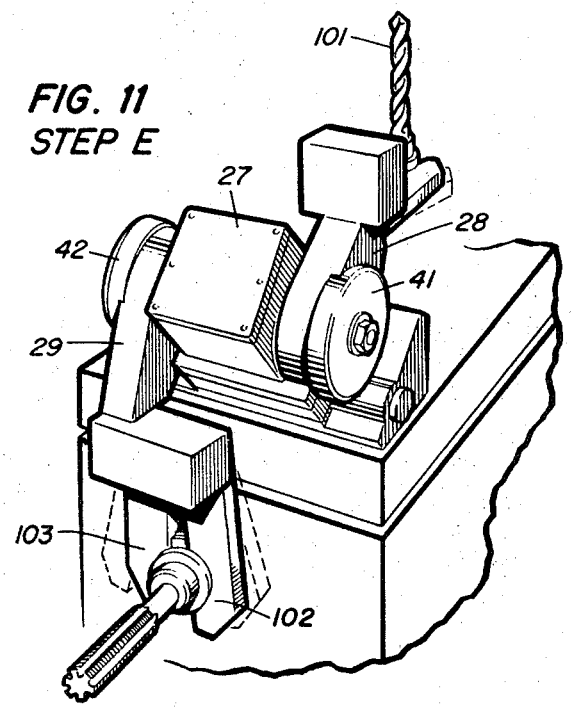

FIGS. 4 and 5 show the details of construction of the arm 28. One end of the arm is, of course, keyed to the tubular shaft 51, and a straight portion 87 of the arm extends at a right angle to the axis of the shaft 51; that is to say, in a direction parallel to a vertical plane through the axis A—A. At its outer end it is provided with an offset portion 88 which is directed back toward the axis A—A. Extending longitudinally of the straight portion 87 is a slide rod 89 which has a cam follower 91 which engages in and is slidable in a cam groove 92 formed in the inner surface of the cam plate 41. Formed in the other end of the slide rod 89 is a rack 93 which engages a pinion gear 95 which, in turn, meshes with a gear 94. The gear 95 is mounted on a shaft 96 on which is keyed one clamping finger 97, while the other gear is similarly mounted on and serves to drive a shaft (not shown) which operates the other clamping finger (not shown). The teeth on the rack 93 are straight and the teeth on the gears 94 and 95 are helical. The two clamping fingers 97 and 98 (see FIG. 7) are hinged for motion about their spaced parallel axes in a plane which lies at about 40° to the axis of the slide rod 89 and passes somewhat laterally of the transverse axis of hinging motion. The fingers 97 and 98 are formed to clamp on a suitable flange of a tool holder 99 carrying a tool 101.

Figure 7:
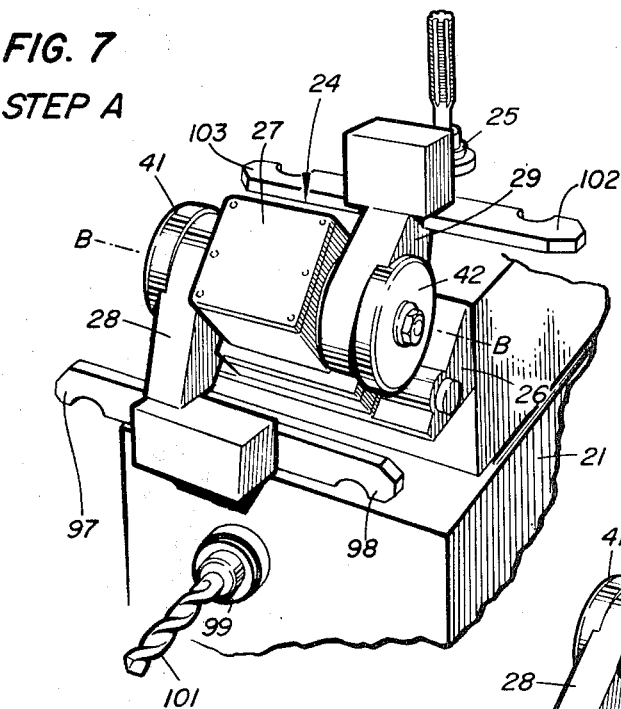
Figure 8:
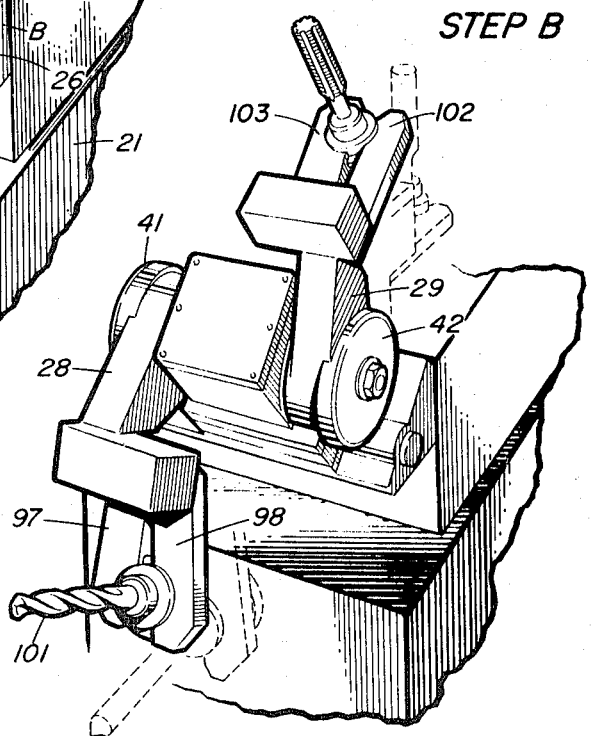

The operation of the apparatus will now be readily understood, in view of the above description. More specifically, the chart in FIGS. 6A and 6B and the perspective views in FIGS. 7 through 11 will be helpful. Starting with the initial condition shown in Step A, it can be seen that the cam follower 91 lies in the cam grooves 92 of the cam plate 41 in a position which is closest to the shaft 39. This means that the slide rod 89 is pulled closest to the axis of the shaft 39 and that the fingers 97 and 98 are in open condition, as shown in FIG. 7. This position of the fingers permits the head to advance forward for machining operations without interference with fingers. The open position of fingers 102 and 103 also permits a new tool to be presented for pick-up from the storage. At this time the spindle 22 in the toolhead 21 is rotating and performing a machining operation. In this condition, the slide 75 which controls the arms 28 and 29 is at the extreme left end of the cam groove 61, so that the arm 28 and arm 29 are in position to grasp the tool holder and tool sitting in the interchange position 25. It does not grasp the tool holder, however, because of the fact that the cam follower 91 is in the low position of the cam groove 92. At the same time, the housing is in its rest position, so that the transverse hinge axis B—B is horizontal and is at a right angle to a plane joining the spindle 22 and the interchange position 25 of the tool rack. All of this is the condition shown in FIG. 7.

Figure 9:
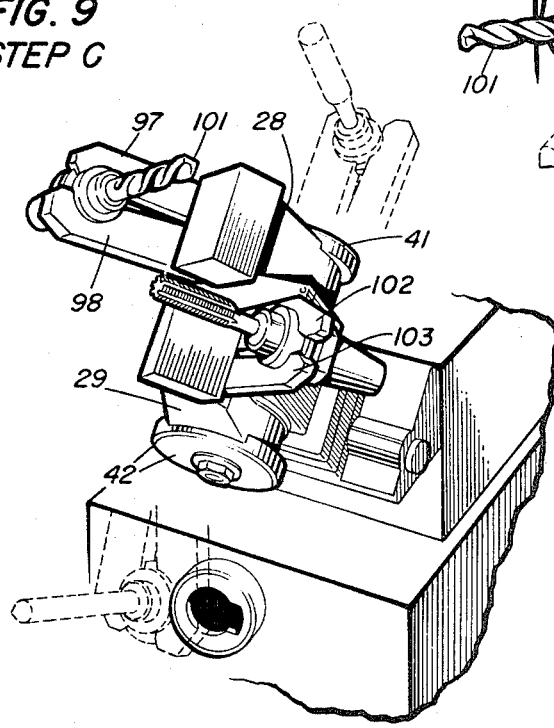

When the machining operation has been completed the head retracts to interchange position and tool retention in spindle is released. The pressure oil to the main actuating piston 31 is presented and this begins the rotation of the shaft 34. This, of course, operates through the gear 37, the gear 38, and the shaft 51 to rotate the cam plate 41 and this moves the cam follower 91 into a position in the cam groove 92 which is further from the axis B—B. This causes the fingers 97 and 98 to move toward clamping position on the tool holder which is engaged with the spindle 22. Rotation of the shaft 34 causes a rotation of the disc 79 which, in turn, rotates the disc 62. The effect of that action is to also rotate the slides 66 and 75 which lie in the grooves 65 and 74, respectively on opposite sides of the disc 62. The slides have to rotate at the same rotational speed as the shaft 34, but they transmit motion to the pinions 47 and 71 at an entirely different rate. Although the slides 66 and 75 are not permitted to rotate relative to the disc 62, they are allowed to slide. The engagement of their cam followers with their respective cam grooves causes this sliding to take place, thus transmitting the selected motions to their pinions and, eventually, to the housing and arms. When the shaft 34 starts to rotate, as shown in Step A, the cam follower 78 leaves the end of the cam groove 61 and starts moving along it. The first section of the cam groove 61 has a decreasing radius with the axis A—A, so that this produces longitudinal motion of the rack 76 to maintain gear 47 in a stationary position. In a similar way, the slide 66 at the start of the movement of its cam follower 67 along the cam groove 59 is displaced axially to maintain gear 71 stationary and, therefore, no motion is transmitted to the housing 27. In Step B, the position of the cam follower 91 in the cam groove 92 means that the fingers 97 and 98 have grasped the tool holder, both the tool holder and tool which resides at the spindle and the one which is at the interchange position; that is to say, the old tool as well as the new tool. At the same time, the slide 75 moves slightly because of the curvature of the cam groove 61 in Step B, but the slide 66 takes part in no appreciable motion because the curvature of the cam groove 59 has maintained gear 47 stationary. This means, as is obvious in FIG. 8, that the finger clamp the tool holder in both positions and the arms move slightly about the axis B—B, thus pulling the tool holder and its tool out of the connection with the spindle 22 and moving the tool holder and tool away from the socket in the tool rack 23. As a matter of fact, in this position, the tool holders are entirely free of the socket in the spindle and the socket in the tool rack. In Step C, the cam follower 91 is moving through a circular portion of the cam groove 92 which is concentric with the axis B—B of the shaft 39. This produces, therefore, no change in the clamping action of the fingers 97 and 98. The movement, however, of the cam follower 78 in the cam groove 61 causes movement of the slide 75 in a direction that the rack 77 rotates the gear 47 at a high rate of speed. This action operates through the tubular shaft 44, the gear 48, the gear 49, and the tubular shaft 51 to rotate the arms 28 and 29 in a direction toward one another, so that they occupy the condition shown in FIG. 9 with the tools pointing directly at one another with their axes more or less at a right angle and the arms very compactly situated relative to the axis A—A. In the meanwhile, the cam groove 59 changes its curvature fairly extremely to rotate the housing 180°, as indicated in FIG. 9 for Step C.

In Step D, the cam follower 91 still is sliding through a concentric portion of the cam groove 92, so that the clamping action is not changed and the fingers continue to engage the old and new tool and tool holder. At the same time, the continued rotation of the plate 62 carrying the slide 75 with it causes the cam follower 78 to slide back in the other direction, thus reversing the arm action and moving the arms back to their original positions extending in opposed directions from the transverse axis B—B, so that the situation shown in FIG. 10 for Step D begins to evolve. The cam follower associated with the slide 66 begins to approach a portion of the cam groove 59 which slopes inwardly toward the A—A axis. The cam curvatures are shaped to permit smooth acceleration and deceleration of components and to compensate for differential action created by rotation of housing relative to arms.

Finally, in Step E, the cam follower 91 drops into the valley in the cam groove 92 close to the axis B—B, so that the fingers unclamp themselves from the holders. However, before this is done, the arms have been moved rapidly into their last positions, so that the tool holders enter the socket in the spindle 22 and the socket in the tool rack. This is the extreme position for the cam follower 78 in the cam groove 61 and, at that point, it is closest to the axis A—A and has produced the most extreme motion of the slide 75, which means that the arms are thrown to their furthermost position. In the same way, the cam follower of the slide 66 has reached the extreme end of the cam groove 59 and the housing is in its exterme position of 180° from the initial position.

When the tool at this point in the machine cycle is finished with the machining operation, the cycle is reversed. This is accomplished by putting pressure oil at the other end of the piston 31 and this moves the cam followers around in the opposite direction reversing the steps shown in the chart until all the cam followers are back in their original position shown before Step A has started.

It can be seen from the above discussion, that the present invention provides an interchanger for a numerically-controlled tool-changer-type machine tool, wherein the interchanger is almost entirely of the mechanical type, the only hydraulics involved being in the operation of the piston 31; it involves no electrical arrangement at all other than control signals. The fact that the cam grooves 92, 61, and 59 can be designed for various curvatures and rates and, furthermore, since they are easily replaced, as is evident in the drawing, it is possible to make changes in the operation of the tools, if need be, to suit peculiar conditions. The equipment can be repaired and maintained by ordinary mechanics. The operation in the dirt-filled atmosphere of a machine tool in operation with chips and cooling fluid present will be excellent, since electrical and hydraulic equipment tend to run into difficulty under such conditions, but mechanical devices seem to survive very well. In addition, because the arms fold toward one another and the tools overlap in somewhat the same direction toward one another, the space occupied by the interchanger as it is turning through 180° is minimal. This means that in designing a machine tool around this interchanger it is possible to bring other elements quite close to the A—A axis without conflict with the moving arms and tools.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising
   (a) a toolhead in which a spindle is rotatably mounted,
   (b) a tool storage rack containing means for storing a plurality of tools and delivering them one-at-a-time to an interchange position where the axis of each tool so delivered extends generally at a right angle to the spindle axis, and
   (c) an interchanger mounted between the said position and the spindle for moving a tool between the position and the spindle, the interchanger including a main housing rotatable about an axis lying at a substantial angle to the spindle axis and the axis of a tool when in the said position, including two arms mounted on opposite sides of the main housing, and connected for motion about a hinge axis passing at a right angle to the housing axis, and extending laterally from the hinge axis in opposite directions, and including at the end of each arm a clamping head, the main housing being rotatable about its axis, the arms being rotatable about their hinge axis, and the clamping heads being actuated, all by a single train mechanism, the mechanism including a hydraulic actuator rotating a drive shaft that extends through the main housing coaxially of its axis, the said drive shaft being provided on one end with a spur gear by which it is driven and at the other end with a first bevel gear, a clamp actuating means being mounted on one end of a hinge shaft which is coaxial to the said hinge axis and which is provided at the other end with a bevel gear which engages and is driven by the said first bevel gear, the rotation of the hinge shaft causing the clamping head to be actuated.

2. A machine tool as recited in claim 1, wherein each arm is clamped to one end of a tubular shaft which is rotatably mounted coaxially of the hinge shaft and is provided on the other end with a bevel gear and wherein a tubular operating shaft is rotatably mounted on the drive shaft and is provided with a bevel gear which engages the last-named bevel gear, the exterior of the operating shaft having a gear by which it is driven.

3. A machine tool as recited in claim 2, wherein the main housing has a tubular portion which is rotatably mounted coaxially of the operating shaft and the tubular portion is formed with a gear for driving it.

4. A machine tool, comprising
   (a) a toolhead in which a spindle is rotatably mounted,
   (b) a tool storage rack containing means for storing a plurality of tools and delivering them one-at-a-time to an interchange position where the axis of each tool so delivered extends generally at a right angle to the spindle axis, and
   (c) an interchanger mounted between the said position and the spindle for moving a tool between the position and the spindle, the interchanger including a main housing rotatable about an axis lying at a substantial angle to the spindle axis and the axis of a tool when in the said position, including two arms mounted on opposite sides of the main housing, and connected for motion about a hinge axis passing at a right angle to the housing axis, and extending laterally from the hinge axis in opposite directions, and including at the end of each arm, a clamping head, the main housing being rotatable about its axis, the arms being rotatable about their hinge axes, and the clamping heads being actuated, all by a single train mechanism, the mechanism including a clamp shaft driven by a motor, a tubular arm shaft being rotatably carried on the clamp shaft, and a tubular housing extension being rotatably carried on the arm shaft, the clamp shaft also driving a disc which is coaxial with it, in an arm slide being mounted on one side of the disc and a housing slide being mounted on the other, both slides being mounted on the disc so that they can slide diametrically across it, but not rotate relative to it, each slide having a cam follower which engages a cam groove on a fixed plate forcing its own slide of the disc, the arm slide having a rack engaging a gear on the arm shaft and the housing slide having a rack which engages a gear on the housing extension.

5. A machine tool, comprising
   (a) a toolhead in which a spindle is rotatably mounted,
   (b) a tool storage rack containing means for storing a plurality of tools and delivering them one-at-a-time to an interchange position where the axis of each tool so delivered extends generally at a right angle to the spindle axis, and
   (c) an interchanger mounted between the said position and the spindle for moving a tool between the position and the spindle, the interchanger including a main housing rotatable about an axis lying at a substantial angle to the spindle axis and the axis of a tool when in the said position, including two arms mounted on opposite sdies of the main housing, each arm mounted on one of two coaxial shafts for hinged motion about the common hinge axis of the shaft which passes through and lies at a right angle to the housing axis, the arms extending laterally from the said hinge axis in opposite directions, and including at the end of each arm a clamping head.

6. A machine tool as recited in claim 5, wherein the spindle axis, the main housing axis, and the axis of a tool in the said position lie in the same plane, and wherein each arm has an elongated portion which lies in a plane which is parallel to and spaced from the said plane as an offset portion which on occasion carries the clamping head to a position adjacent the said plane.

7. A machine tool as recited in claim 5, wherein the main housing is rotated about its axis, the arms are rotated about their hinge axes, and the clamping heads are actuated, all by a single train mechanism.

8. A machine tool as recited in claim 7, wherein the mechanism includes a hydraulic actuator rotating a drive shaft that extends through the main housing coaxially of its axis.

References Cited

UNITED STATES PATENTS 3,492,717    2/1970    Seidel et al. ............ 29—568

ANDREW R. JUHASZ, Primary Examiner

Z. R. BILINSKY, Assistant Examiner